UNITED STATES PATENT OFFICE.

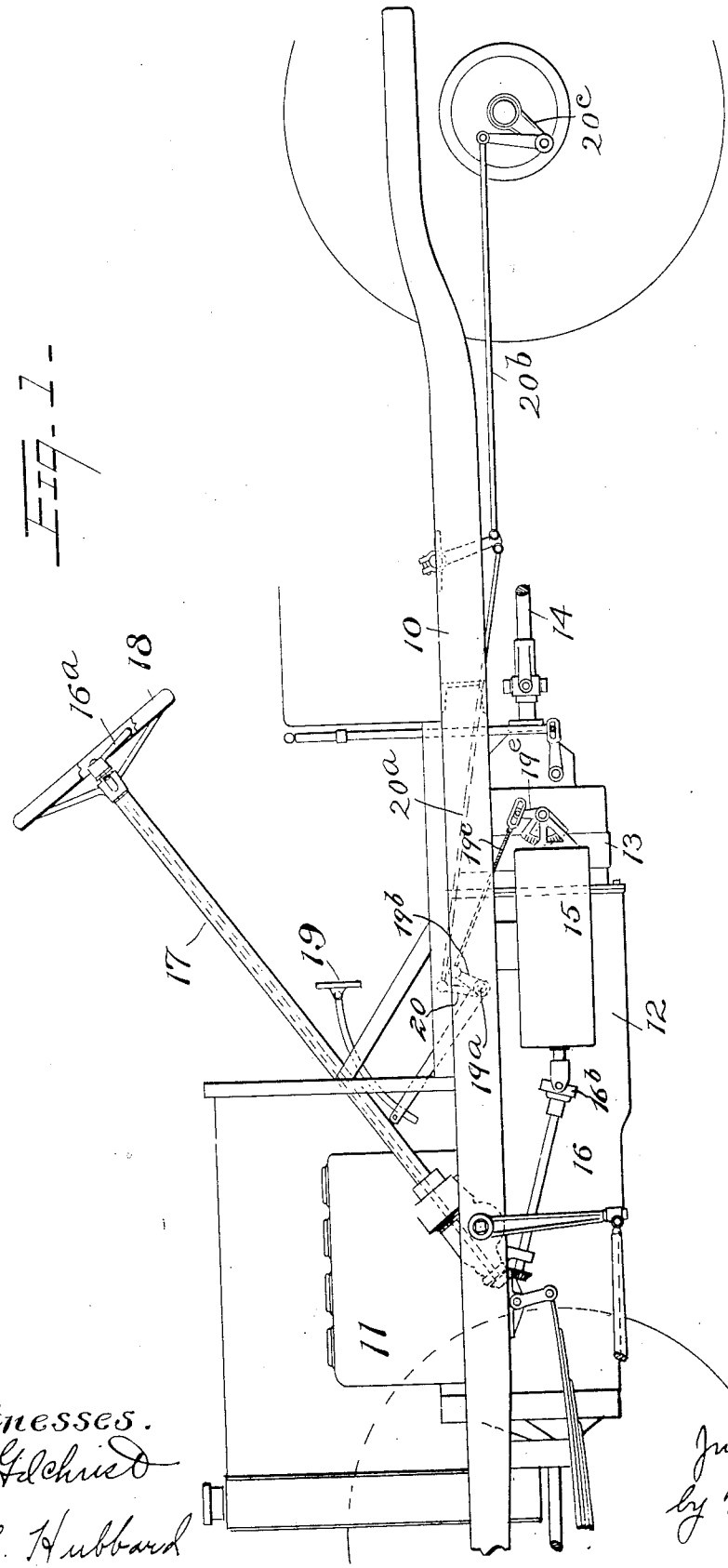

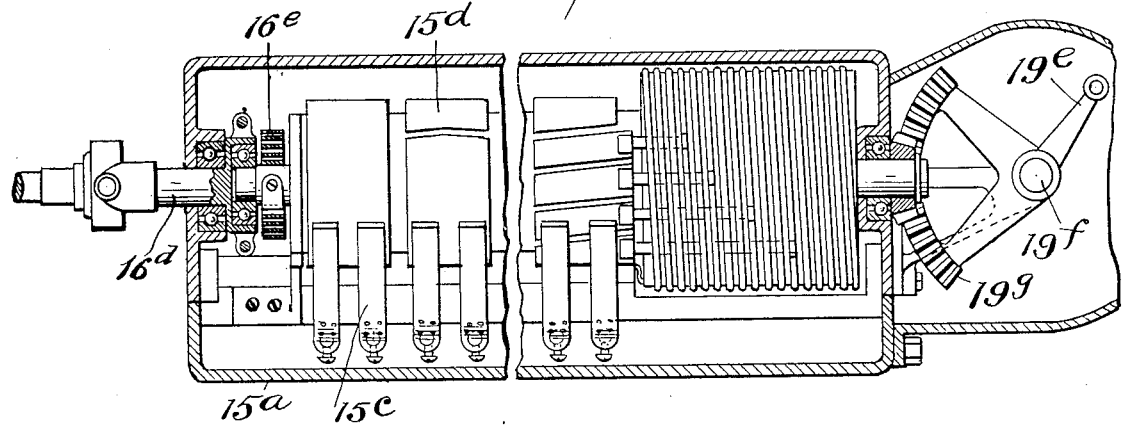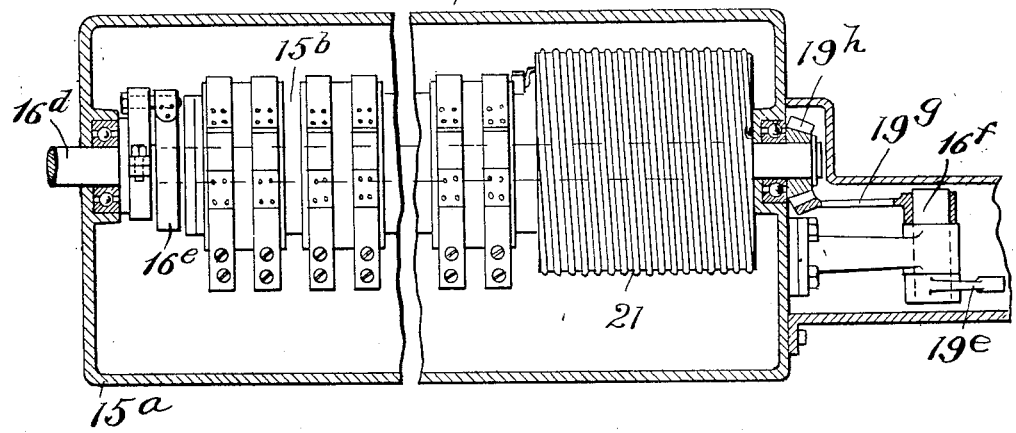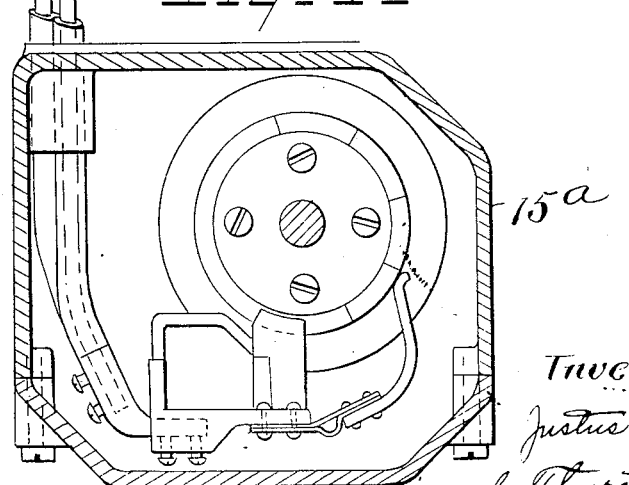

JUSTUS B. ENTZ, OF CLEVELAND, OHIO.

VEHICLE CONTROL.

1,307,810.

Specification of Letters Patent. Patented June 24, 1919.

Application filed April 3, 1913. Serial No. 758,522.

*To all whom it may concern:*

Be it known that I, JUSTUS B. ENTZ, a citizen of the United States, residing at Cleveland, in the county of Cuyahoga and State of Ohio, have invented a certain new and useful Improvement in Vehicle-Controls, of which the following is a full, clear, and exact description.

This invention relates to certain features of control of motor vehicles having a propelling mechanism including one or more electrical units. My invention is particularly adapted, although not necessarily confined, to vehicles having propelling mechanism of the type disclosed in my prior Patent No. 732,062, for power transmission and control, June 30th, 1903, and as disclosed in my prior pending application for self propelled vehicles, filed February 24th, 1908, Serial No. 417,309, and as further disclosed in an application for motor vehicles, Serial No. 758,521, filed of even date herewith.

One of the features of the present invention resides in the novel arrangement by which the transmission of power may be controlled by foot operated mechanism, independently of the hand operated mechanism through which the transmission of power is normally controlled. In the present embodiment of my invention, the foot control is obtained by an arrangement of controller and of the hand and foot operated mechanism, such that although the controller drum is normally moved to and from off position by the hand-operated mechanism, the controller can be moved to or toward off position by the foot operated mechanism, and independently of the hand operated mechanism.

In this respect, my invention is an improvement over an arrangement shown in my prior application above referred to, Serial No. 417,309, and wherein the transmission of power is controlled by foot operated mechanism including a short circuiting switch which when closed throws out of operation the engine driven generator which is adapted to supply current to a driving motor.

Another feature of my invention resides in the arrangement of the resistance sections of the control system, the resistance, in accordance with the present invention, being arranged on the controller drum, or upon a rotatable part of the controller, the said arrangement having for its principal advantage, the elimination of the necessity for a large number of contact fingers, for coöperating with segments to cut the resistance sections into or out of circuit.

My invention may be here further briefly summarized, as consisting in certain novel details of construction and combinations and arrangements of parts which will be described in the specification and set forth in the appended claims.

In the accompanying drawings, wherein I have shown the preferred embodiment of my invention, Figure 1 is a side view of a portion of a motor vehicle equipped with my invention; Fig. 2 is a longitudinal sectional view through the controller; Fig. 3 is a similar sectional view taken at right angles to Fig. 2; and Fig. 4 is a transverse sectional view.

In Fig. 1, I have shown my invention applied to a motor vehicle having propelling mechanism of the type shown in my prior patent and applications previously referred to, wherein said propelling mechanism includes a prime mover in the form of a gas engine, a generator, one element of which is adapted to be driven by the gas engine, and a driving motor which is adapted to receive current from the generator to assist in propelling the vehicle. I have not deemed it necessary to here show the electrical units, as my invention does not reside in these parts, but for a complete understanding of the arrangement of the parts of said propelling mechanism, reference is made to my prior patent aforesaid, and especially to my prior application Serial No. 417,309, or to the said application filed of even date herewith.

In the drawings, 10 represents the chassis of the motor vehicle, which is provided with propelling mechanism including a gas engine 11. The generator and motor are inclosed respectively within the rear part of a casing 12, and the casing or housing 13. Power is transmitted to the rear axle through the medium of a driving shaft 14.

Arranged at the side of the electrical units and supported from the chassis in any suitable manner is a controller 15. By reference to Figs. 2, 3 and 4, it will be seen that the controller includes in addition to the controller housing or casing 15$^a$, the drum 15$^b$, and suitable contact fingers 15$^c$, which coöperate with segments 15$^d$ carried by the drum. The drum is normally shifted from and to off position by hand operated mechanism 16, which includes a suitable handle or hand operating member 16ª, and which is preferably located at the top of the steering column. This member 16ª will be connected to a shaft, shown by dotted lines in Fig. 1, which extends through the steering column and at its lower end has an operative connection with a coupling device 16ᵇ, which extends from the lower part of the steering column to the front end of the controller. This coupling device 16ᵇ is connected to a short shaft 16ᵈ extending into the front end of the controller casing 15ª. This shaft is connected to the forward end of the shaft of the controller drum through the medium of a coil spring 16ᵉ, which constitutes a flexible connection between the controller drum and the said manual operating mechanism, and which has its inner end connected to the drum, or the shaft of the drum, as shown in Fig. 2, and its outer end connected to the short shaft 16ᵈ, as shown in Fig. 3. This spring is under initial tension, when all parts are in normal position, and the drum is in off position. Thus the controller can be turned, step by step, through the hand operated mechanism above described.

In order that the transmission of power may be controlled very quickly without shifting the controller handle, or hand operating member 16ª, such as is frequently desirable, especially in cases of emergency, I provide a foot operated or controlled mechanism including a foot pedal 19 connected to a shaft 19ª having an arm 19ᵇ, connected by a link 19ᶜ or equivalent device, to an arm 19ᵉ secured to a short shaft 19ᶠ at the rear end of the controller. This shaft has secured to it, a bevel gear 19ᵍ which meshes with a smaller bevel gear 19ʰ secured to the rear end of the shaft of the controller drum. The link 19ᶜ has a loose or pin and slot connection with the arm 19ᵉ so that the drum can be turned from off to full-on position without causing any movement of the foot pedal.

This foot control mechanism may be utilized also for applying a brake to the vehicle, in addition to controlling the transmission of power, and therefore the shaft 19ª is provided with an arm 20, connected by suitable links 20ª and 20ᵇ to the brake mechanism 20ᶜ at the driving wheels of the vehicle.

It will be readily seen that by reason of the above described mechanism, by depressing the foot pedal, the drum can be turned to or toward off position, and the brake may be applied even though the hand operated mechanism is held against movement, this movement of the drum by the foot control mechanism simply putting increased tension in the spring 16ᵉ. Consequently, when the foot pedal is released, the drum immediately returns to its previous position. If the foot pedal is allowed to return to its previous position gradually under the action of the spring, the drum may be returned to its previous position, step by step, thus allowing the vehicle to speed up gradually.

To avoid the necessity for a large number of contact fingers, for cutting into and out of circuit the resistance sections, as is usually the case in controllers or control systems wherein the resistance is located outside of the controller, I place the resistance, which is shown at 21, upon an extension of the controller drum, the resistance being preferably wound spirally upon the drum as shown. From different points of the resistance suitable taps are brought out and connected to segments of the drum, which are engaged in this case by a pair of fingers, although a single finger is all that is required.

Having thus described my invention, what I claim is:

1. Means for controlling the transmission of power in a motor vehicle having propelling mechanism including an electrical unit, comprising a rotatable controller element, hand operated rotatable mechanism for normally moving said controller from and to off position, a coiled spring forming a rotatable driving connection between said hand operated mechanism and said controller, a foot controlled mechanism connected to the controller for operating the same independently of the hand operated mechanism, the connection between the foot controlled mechanism and the controller including a sliding connection.

2. Means for controlling the transmission of power in a motor vehicle having propelling mechanism including an electrical unit, comprising a controller having a rotatable part, a hand operated rotatable mechanism, a coiled spring forming a rotatable driving connection between said hand operated mechanism and the rotatable part of the controller, a foot controlled mechanism operatively connected with the rotatable part of the controller, the connection between the foot controlled mechanism and the controller including a sliding connection.

3. Means for controlling the transmission of power in a motor vehicle having propelling mechanism, including an electrical unit, comprising a controller having a rotatable portion, a hand operated rotatable mechanism, a coiled spring forming a rotatable driving connection between the hand operated mechanism and the rotatable portion of the controller, a foot controlled mechanism, a gear carried by the movable portion of the controller, a rack coöperating the said gear and operative connections between the said rack and the foot controlled mechanism, said connections including a lost motion connection.

4. Means for controlling the transmission of power in a motor vehicle having a propelling mechanism including an electrical unit, said means comprising a controller having a drum, hand operated mechanism for normally turning said drum from and to off position, braking mechanism, and foot controlled mechanism for operating the braking mechanism and for shifting the drum independently of the hand operated mechanism.

In testimony whereof, I hereunto affix my signature in the presence of two witnesses.

JUSTUS B. ENTZ.

Witnesses:
A. J. HUDSON,
N. C. HUBBARD.